(12) United States Patent
Nishibashi et al.

(10) Patent No.: US 9,311,828 B2
(45) Date of Patent: Apr. 12, 2016

(54) NAVIGATION DEVICE

(75) Inventors: Kumi Nishibashi, Tokyo (JP); Takashi Irie, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 370 days.

(21) Appl. No.: 13/580,929

(22) PCT Filed: Mar. 11, 2010

(86) PCT No.: PCT/JP2010/001745
§ 371 (c)(1),
(2), (4) Date: Aug. 23, 2012

(87) PCT Pub. No.: WO2011/111107
PCT Pub. Date: Sep. 15, 2011

(65) Prior Publication Data
US 2013/0013189 A1     Jan. 10, 2013

(51) Int. Cl.
  *G09B 29/00* (2006.01)
  *G09B 29/10* (2006.01)
  *G01C 21/34* (2006.01)

(52) U.S. Cl.
  CPC .......... *G09B 29/007* (2013.01); *G01C 21/3461* (2013.01); *G09B 29/10* (2013.01)

(58) Field of Classification Search
None
See application file for complete search history.

(56) References Cited

U.S. PATENT DOCUMENTS

| 2001/0021895 A1 | 9/2001 | Yamazaki |
| 2005/0071080 A1 | 3/2005 | Sano |
| 2007/0050134 A1 | 3/2007 | Hayashida et al. |
| 2009/0248294 A1 | 10/2009 | Machino |
| 2009/0326804 A1 | 12/2009 | Machino |
| 2010/0063720 A1 | 3/2010 | Machino |
| 2010/0094538 A1* | 4/2010 | Machino ................. 701/201 |
| 2011/0022302 A1* | 1/2011 | Machino ................. 701/201 |

FOREIGN PATENT DOCUMENTS

| JP | 2-278116 A | 11/1990 |
| JP | 11-257988 A | 9/1999 |
| JP | 2001-183159 A | 7/2001 |
| JP | 2005-61988 A | 3/2005 |
| JP | 2005-77299 A | 3/2005 |
| JP | 2006-292574 A | 10/2006 |
| JP | 3908425 B2 | 1/2007 |
| JP | 2007-86052 A | 4/2007 |
| JP | 2007-94703 A | 4/2007 |
| JP | 2010-32541 A | 2/2010 |

(Continued)

*Primary Examiner* — Yonel Beaulieu
*Assistant Examiner* — Krishnan Ramesh
(74) *Attorney, Agent, or Firm* — Birch, Stewart, Kolasch & Birch, LLP

(57) ABSTRACT

A navigation device includes a route searching unit for searching for a route leading to an arbitrary point on the basis of map data acquired by a map data acquiring unit, an HOV lane determining unit for determining whether or not an HOV lane is included in the route which the route searching unit has searched for, a predicted arrival time calculating unit for, when the HOV lane determining unit determines that an HOV lane is included in the route, calculating a predicted arrival time required to arrive at the arbitrary point by way of the route which is shorter than a time required to arrive at the arbitrary point by way of a route in which no HOV lane is included, and a display processing unit for displaying the predicted arrival time calculated by the predicted arrival time calculating unit.

1 Claim, 14 Drawing Sheets

(56) References Cited

FOREIGN PATENT DOCUMENTS

| WO | WO 2008/068954 A1 | 6/2008 |
| WO | WO 2008/075496 A1 | 6/2008 |
| WO | WO 2008/084580 A1 | 7/2008 |
| WO | WO 2009/133651 A1 | 11/2009 |

* cited by examiner

Predicted Arrival Time Calculated in Consideration of Travel in HOV Lane

Predicted Fuel Efficiency Calculated in
Consideration of Travel in HOV Lane

Display Predicted Arrival Time and
Predicted Fuel Efficiency Calculated in
Consideration of Travel in HOV Lane

NAVIGATION DEVICE

FIELD OF THE INVENTION

The present invention relates to a navigation device that guides a user to his or her destination. More particularly, it relates to a technology of, when using a map including HOV lane (High Occupancy Vehicle lane) information, performing a route search in consideration of an HOV lane, and provides guidance on information about a route which takes an HOV lane into consideration.

BACKGROUND OF THE INVENTION

Conventionally, an HOV lane or the like which is used in a road system mainly seen in, for example, a North American big city is known as a road on which restrictions showing which vehicles can enter the road are imposed. An HOV lane is also called a carpool lane and is a lane in which only vehicles with two or more people are allowed to travel. A lane disposed along with normal lanes on a highway, a lane which is a shortcut of an interchange, etc. are known as HOV lanes. A road system which adopts such an HOV lane provides the user with a preferential treatment that makes it possible to arrive at his or her destination in a shorter time as long as the user travels in an HOV lane so as to prod the user to share the vehicle with one or more other persons, thereby reducing the traffic as a whole and therefore reducing traffic jams.

As a technique relating to such an HOV lane, patent reference 1 discloses a navigation device which searches for a route using information about HOV lanes as road information about a route leading to a destination set up by the user. In this navigation device, map data including road information about entrance and exit points in a highway having an HOV lane are read from a DVD and are stored in a data buffer in order to enable the user to efficiently travel in a lane on which restrictions against lane changes for entrance from and exit to another lane are imposed. A route search processing unit carries out a route search process in consideration of the enable or disable of use of an HOV lane by using the map data stored in the data buffer. When providing route guidance using an HOV lane, an HOV lane guidance unit provides guidance on a certain lane change with an image and a voice at the time that an entrance or exit point at which the user's vehicle should change its traveling direction falls within a predetermined distance from the position of the vehicle.

Further, a navigation system which provides route guidance in such a way as to enable the vehicle to economically travel by selecting a route with a small degree of fuel consumption is known (for example, refer to patent reference 2). A signal processing device in this navigation system has a unit for defining each of intersections included in each of a plurality of inputted routes as a boundary to compute the time required to travel over each section between two adjacent ones of the intersections, the travel distance between them, and the degree of fuel efficiency with which the vehicle travels over each section, stores the time, the travel distance, and the degree of fuel efficiency as a database for each travel, for enabling a search for a route which provides the shortest time, a route which provides the shortest distance, or a route with the highest degree of fuel efficiency by using those data, and for displaying the route searched for.

RELATED ART DOCUMENT

Patent Reference

Patent reference 1: Japanese Unexamined Patent Application Publication No. 2001-183159

Patent reference 2: Japanese Unexamined Patent Application Publication No. Hei 02-278116

A problem with the navigation device disclosed by above-mentioned patent reference 1 is, however, that the calculation of a predicted arrival time and a predicted degree of fuel efficiency in consideration of travel in an HOV lane, the use or non-use of an HOV lane according to a set mode, and a technique of determining whether or not to use an HOV lane in consideration of the presence or absence of a traffic jam are not disclosed, and information about a suitable route which should be provided for the user is insufficient.

The present invention is made in order to solve the above-mentioned problem, and it is therefore an object of the present invention to provide a navigation device which can present information about a suitable route to the user.

SUMMARY OF THE INVENTION

In accordance with the present invention, there is provided a navigation device including: an input unit for setting a destination; a current position detecting unit for detecting a current position of a vehicle; a map data acquiring unit for acquiring map data including road data in which an HOV lane and a normal lane are shown by a link; and a route searching unit for searching for a route leading from the current position to the destination by using the map data, in which the route searching unit searches for a route leading from the current position to the destination and not using any HOV lane, and, after that, when the route includes a highway, makes a re-search only in the highway on the route on a basis of usable or unusable of an HOV lane.

Further, in accordance with the present invention, there is provided a navigation device including: an input unit for setting a destination; a current position detecting unit for detecting a current position of a vehicle; a map data acquiring unit for acquiring map data including road data in which an HOV lane and a normal lane are shown by a link; and a route searching unit for searching for a route leading from the current position to the destination by using the map data, in which when a highway exists in the route leading from the current position to the destination, the route searching unit searches for both a route leading from the current position to a highway entrance which is nearest to the current position, and a route leading from a highway exit which is nearest to the destination to the destination, and, after that, searches for a route between the highway entrance and the highway exit on a basis of usable or unusable of an HOV lane.

Further, in accordance with the present invention, there is provided a navigation device including: an input unit for setting a destination; a current position detecting unit for detecting a current position of a vehicle a map data acquiring unit for acquiring map data including road data in which an HOV lane and a normal lane are shown by a link; a search mode determining unit for determining a search mode at a time of performing a route search; and a route searching unit for searching for a route leading from the current position to the destination by using the map data according to the search mode determined by the search mode determining unit.

Further, in accordance with the present invention, there is provided a navigation device including: an input unit for setting a destination; a current position detecting unit for detecting a current position of a vehicle; a map data acquiring unit for acquiring map data including road data in which an HOV lane and a normal lane are shown by a link; an HOV lane entrance/exit extracting unit for extracting entrances and exits of an HOV lane; a traffic state determining unit for determining a traffic state on a basis of traffic information received by a traffic information receiver; and a route searching unit for searching for a route leading from the current position to the destination by using the map data, in which the route searching unit selects an entrance and an exit of the HOV lane from the entrances and the exits of the HOV lane extracted by the HOV lane entrance/exit extracting unit according to the traffic state determined by the traffic state determining unit, and searching for a route which uses the selected entrance and the selected exit of the HOV lane.

According to the present invention, information about a suitable route can be presented to the user.

EMBODIMENTS OF THE INVENTION

Hereafter, the preferred embodiments of the present invention will be explained in detail with reference to the drawings.
Embodiment 1.

A navigation device in accordance with Embodiment 1 of the present invention predicts an arrival time required to travel over a route which uses an HOV lane, the predicted arrival time being shorter than that required to travel over a route which uses normal lanes (which mean lanes other than HOV lanes), and displays the predicted arrival time.

Figure 1:
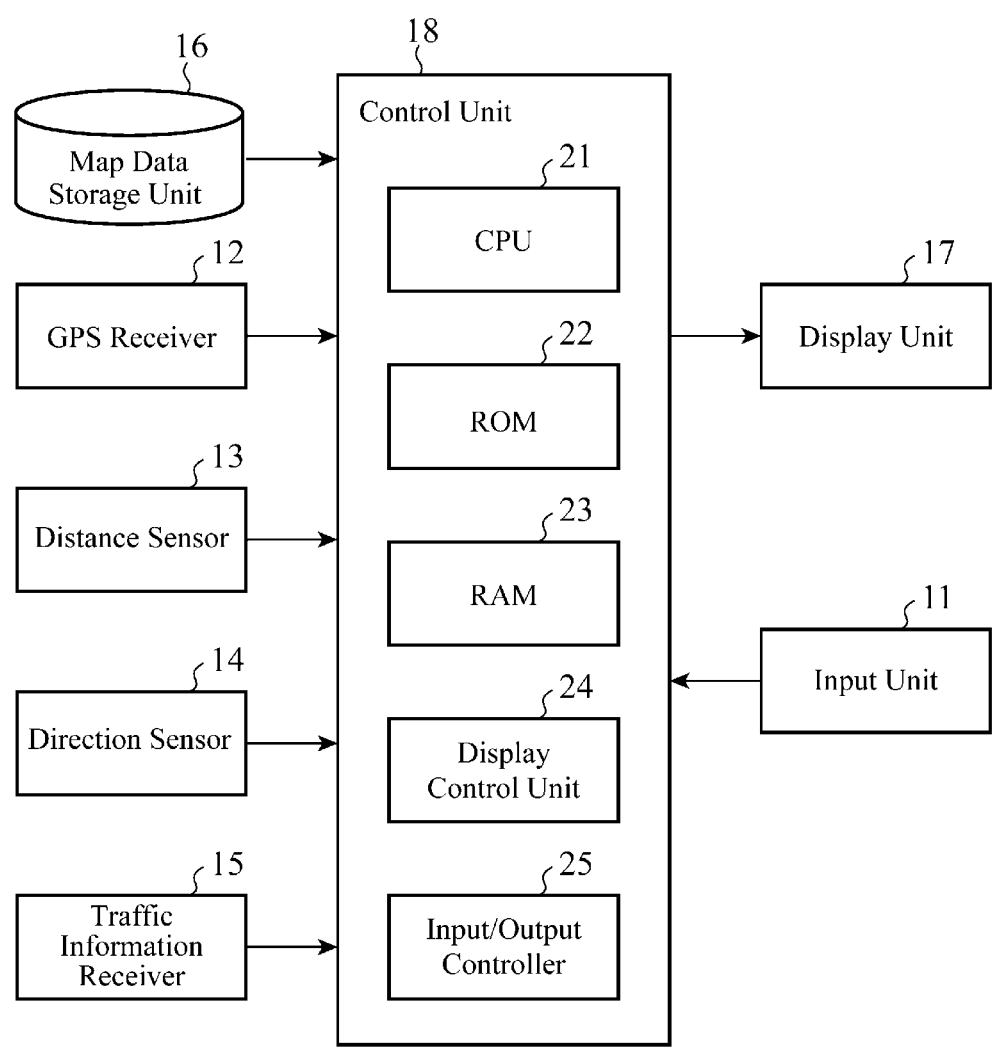
FIG. 1 is a block diagram showing the hardware configuration of a navigation device in accordance with Embodiment 1 of the present invention.

FIG. 1 is a block diagram showing the hardware configuration of the navigation device in accordance with Embodiment 1 of the present invention. This navigation device is provided with an input unit 11, a GPS (Global Positioning System) receiver 12, a distance sensor 13, a direction sensor 14, a traffic information receiver 15, a map data storage unit 16, a display unit 17, and a control unit 18.

The input unit 11 is comprised of, for example, a touch panel placed on the screen of the display unit 17. This input unit 1 is used in order for a user to set up a place of departure, a destination, a waypoint, or the like for a route search, and to provide various instructions to the navigation device, for example. Information inputted from this input unit 11 is sent to the control unit 18 as an operation signal.

The GPS receiver 12 detects the current position of a vehicle equipped with this navigation device on the basis of GPS signals received from GPS satellites. The current position of the vehicle detected by this GPS receiver 12 is informed to the control unit 18 as a current position signal. The distance sensor 13 detects the travel distance of the vehicle. The travel distance detected by this distance sensor 13 is informed to the control unit 18 as a distance signal. The direction sensor 14 detects the direction toward which the vehicle is heading. The heading detected by this direction sensor 14 is informed to the control unit 18 as a heading signal.

The traffic information receiver 15 receives traffic information showing the traffic state of the road in front of the vehicle equipped with this navigation device. The traffic information received by this traffic information receiver 15 is sent to the control unit 18.

The map data storage unit 16 is comprised of, for example, an HDD (Hard Disk Drive) device, and stores digitized map data including road data which define roads by using links and nodes. In a case in which a normal lane and an HOV lane are extending in parallel with each other and they are divided by a painted line, such as a yellow line, instead of a physical partition, data about the normal lane and the HOV lane are stored in map data as road data showing a single road without being defined as different roads. The map data storage unit 16 is not limited to the HDD device, and can be alternatively comprised of a drive device for reading data from a DVD (Digital Versatile Disk) or a CD (Compact Disc) mounted thereto, a USB memory or an SD card.

The display unit 17 is comprised of, for example, an LCD (Liquid Crystal Display), and displays a map, a route, an enlarged view, road numbers, various guide messages, etc. on the screen thereof according to a video signal sent thereto from the control unit 18.

The control unit 18 controls the whole navigation device. The details of functions implemented by this control unit 18 will be mentioned later. The control unit 18 is provided with a CPU (Central Processing Unit) 21, a ROM (Read Only Memory) 22, a RAM (Random Access Memory) 23, a display control unit 24, and an input/output controller 25.

The CPU 21 uses the RAM 23 as a work memory, and operates according to a program read from the ROM 22 to perform various processes including a route search process, a route guidance process, and so on. The ROM 22 stores programs, data and so on which the CPU 21 reads to perform the various processes. The RAM 23 is used as the work memory of the CPU 21, as mentioned above, and temporarily stores data being arithmetically processed (e.g., expanded map data).

The display control unit 24 controls the display unit 17. Concretely, the display control unit 24 converts display data created by the CPU 21 into a video signal, and sends this video signal to the display unit 17 via the input/output controller 25. The input/output controller 25 functions as an interface between the control unit 18, and the input unit 11, the GPS receiver 12, the distance sensor 13, the direction sensor 14, the traffic information receiver 15, the map data storage unit 16 and the display unit 17 which are connected to the control unit 18, and controls transmission and reception of signals among these components.

Figure 2:
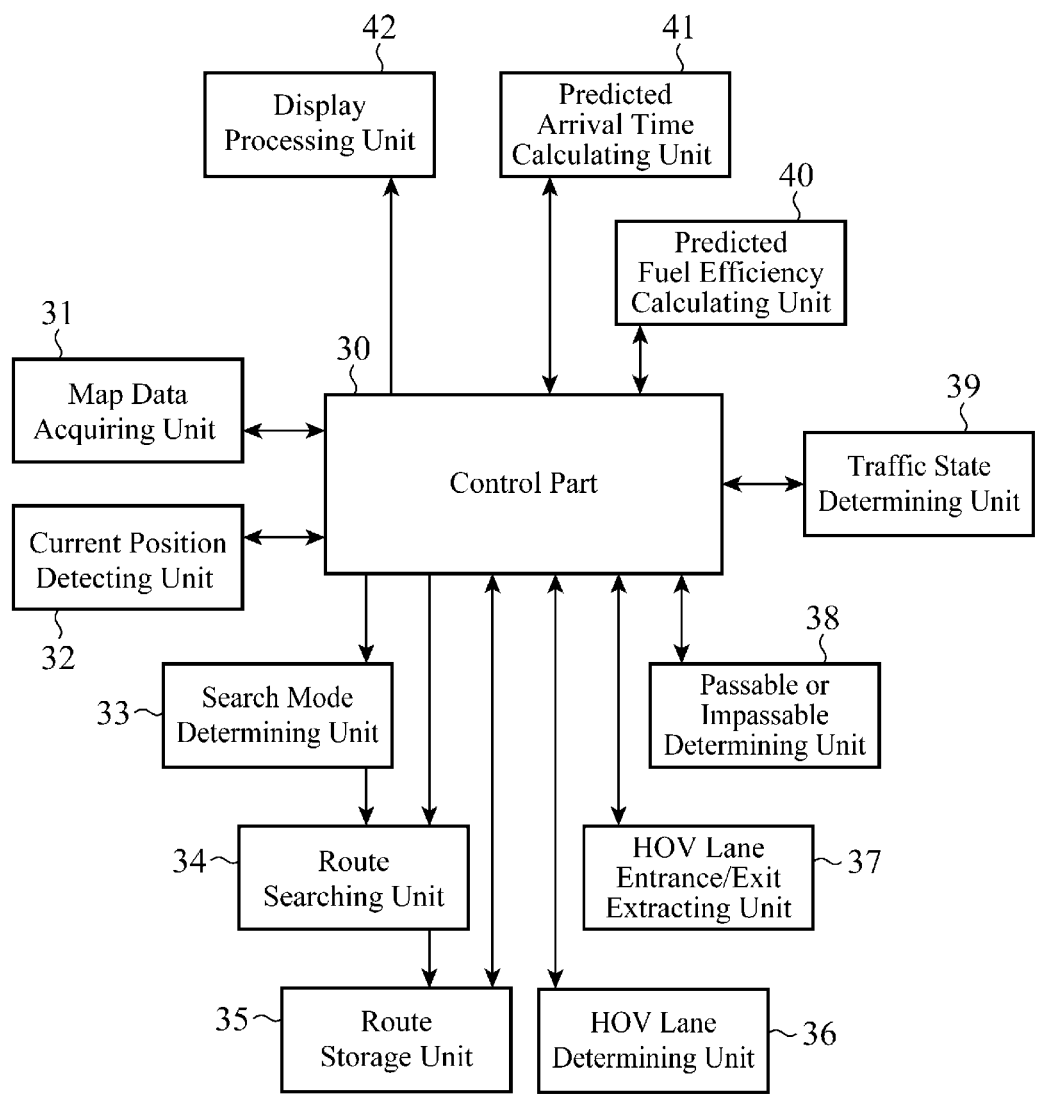
FIG. 2 is a block diagram showing the functional structure of a control unit of the navigation device in accordance with Embodiment 1 of the present invention.

Next, the details of functions implemented by the control unit 18 will be explained. FIG. 2 is a functional block diagram showing the functional configuration of the control unit 18. The control unit 18 is provided with a control part 30, a map data acquiring unit 31, a current position detecting unit 32, a search mode determining unit 33, a route searching unit 34, a route storage unit 35, an HOV lane determining unit 36, an HOV lane entrance/exit extracting unit 37, a passable or impassable determining unit 38, a traffic state determining unit 39, a predicted fuel efficiency calculating unit 40, a predicted arrival time calculating unit 41, and a display processing unit 42. These components except the route storage unit 35 are implemented through program processes performed by the CPU 21.

The control part 30 controls the whole of the control unit 18. For example, the control part 30 controls start and stop of each of the components connected thereto, and transmission and reception of data among these components. The map data acquiring unit 31 reads map data from the map data storage unit 16, and sends the map data to the control part 30.

The current position detecting unit 32 detects the current position of the vehicle on the basis of both the current position signal sent thereto from the GPS receiver 12 or a current position signal which the current position detecting unit has created with dead reckoning by using the heading signal sent thereto from the direction sensor 14 and the distance signal sent thereto from the distance sensor 13, and the map data acquired from the map data processing unit 31 via the control part 30. The current position of the vehicle detected by this current position detecting unit 32 is informed to the control part 30 as vehicle position information. Because all transmission and reception of data among the components connected to the control part 30 are carried out via the control part 30, a statement as to transmission and reception of data being carried out via the control part 30 will be omitted hereafter.

The search mode determining unit 33 determines a search mode ("Easy" or "short") at the time when the route searching unit 34 performs a search for a route in response to an instruction from the control part 30. The result of the determination made by the search mode determining unit 33 is sent to the route searching unit 34. The user is allowed to input a search mode via the input unit 11, and this search mode is informed to the control unit 18 and this information is stored in the control part 30.

The route searching unit 34 searches for a route leading from the place of departure which is either the current position shown by the current position information sent thereto from the current position detecting unit 32 or a position inputted via the input unit 11 to an arbitrary point, e.g. the destination inputted via the input unit 11 according to the search mode informed thereto from the search mode determining unit 33 and on the basis of the map data acquired from the map data acquiring unit 31. The route which this route searching unit 34 has searched for is informed to the route storage unit 35 as route data.

The route storage unit 35 is disposed in, for example, apart of the RAM 23 of the control unit 18, and stores the route data sent thereto from the route searching unit 34. The route data stored in this route storage unit 35 can be read by the control part 30.

The HOV lane determining unit 36 determines whether or not an HOV lane is included in a road shown by the road data included in the map data acquired from the map data acquiring unit 31 or in the route shown by the route data stored in the route storage unit 35. The result of the determination made by this HOV lane determining unit 36 is sent to the control part 30.

When the determination result sent from the HOV lane determining unit 36 shows that an HOV lane is included in a road or the route, the HOV lane entrance/exit extracting unit 37 extracts entrance and exit sections in each of which vehicles are allowed to enter and exit the HOV lane from and to lanes other than the HOV lane. The entrance and exit sections extracted by this HOV lane entrance/exit extracting unit 37 are informed to the control part 30 as entrance/exit position data.

When the HOV lane determining unit 36 determines that an HOV lane is included in a road or the route, the passable or impassable determining unit 38 determines whether the vehicle can travel in the HOV lane of the road or the route. The result of the determination made by this passable or impassable determining unit 38 is sent to the control part 30.

The traffic state determining unit 39 determines a traffic volume or the like at a time of occurrence of a traffic jam on the basis of the traffic information sent thereto from the traffic information receiver 15. The result of the determination made by this traffic state determining unit 39 is sent to the control part 30.

The predicted fuel efficiency calculating unit 40 calculates a degree of fuel efficiency which it is predicted the vehicle equipped with this navigation device will have (referred to as "a predicted degree of fuel efficiency" from here on). A vehicle's fuel efficiency numerically expresses "the distance over which the vehicle can travel with 1 liter of gasoline". In this specification, the unit of the fuel efficiency is defined as mile/L. The predicted degree of fuel efficiency calculated by this predicted fuel efficiency calculating unit 40 is informed to the control part 30 as predicted fuel efficiency data.

The predicted arrival time calculating unit 41 calculates the time required for the vehicle equipped with this navigation device to travel before arriving at a predetermined location (referred to as the "predicted time" from here on). The predicted time calculated by this predicted arrival time calculating unit 41 is informed to the control part 30 as predicted time data.

The map display processing unit 33 creates display data required for displaying the map shown by the map data from the map data acquiring unit 31, the route shown by the route data from the route storage unit 35, each road including an HOV lane shown by the determination result from the HOV lane determining unit 36, the positions of the entrances and the exits to and from the HOV lane shown by the entrance/exit position data from the HOV lane entrance/exit extracting unit 37, each road which the determination result from the passable or impassable determining unit 38 shows the vehicle cannot travel, and so on on the display unit 17. The display data created by this display processing unit 42 are sent to the display control unit 24 disposed within the control unit 18.

Figure 3:
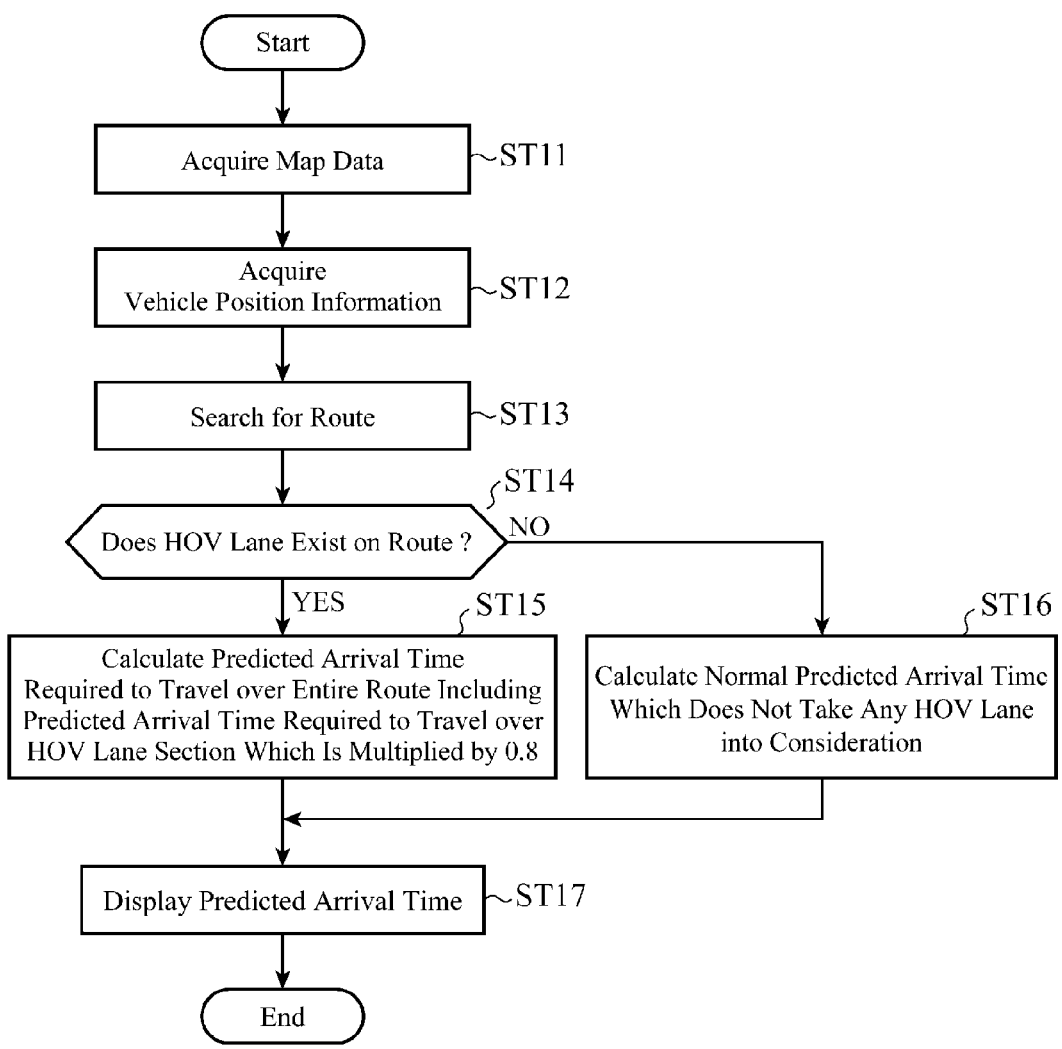
FIG. 3 is a flow chart showing the operation of the navigation device in accordance with Embodiment 1 of the present invention, focusing on a predicted arrival time calculating process.

Next, the operation of the navigation device in accordance with Embodiment 1 of the present invention constructed as mentioned above will be explained with reference to a flow chart shown in FIG. 3, focusing on a predicted arrival time calculating process of calculating a predicted arrival time.

In this predicted arrival time calculating process, map data are acquired first (step ST11). More specifically, the control part 30 acquires map data from the map data storage unit 16 via the map data acquiring unit 31, and sends the map data to the route searching unit 34. The vehicle position information is then acquired (step ST12). More specifically, the control unit 30 acquires the current position information from the current position detecting unit 32, and sends the current position information to the route searching unit 34.

Then, a route search is carried out (step ST13). More specifically, the route searching unit 34 defines the current position shown by the vehicle position information sent thereto from the control part 30 in step ST12 as the place of departure, and, in step ST11, searches for a route to the destination inputted from the input unit 11 on the basis of the map data acquired from the map data acquiring unit 31. The route which this route searching unit 34 has searched for is informed to the route storage unit 35 as route data, and this route data is stored in the route storage unit.

Whether or not an HOV lane exists on the route is then checked to see (step ST14). More specifically, the HOV lane determining unit 36 determines whether or not an HOV lane is included in the route shown by the route data stored in the route storage unit 35, and sends the result of this determination to the predicted arrival time calculating unit 41.

When it is determined in this step ST14 that an HOV lane exists on the route, the predicted arrival time required for the vehicle to travel over the entire route is then calculated, the predicted arrival time including the predicted arrival time required for the vehicle to travel over the HOV lane section over which is multiplied by 0.8 (step ST15). More specifically, because it is predicted that the vehicle can travel over the section in which the vehicle will travel in the HOV lane on the route more smoothly than the vehicle travels in a normal lane, the predicted arrival time calculating unit 41 multiplies the predicted arrival time required for the vehicle to travel over the HOV lane section by 0.8 to set the predicted arrival time to be shorter than the predicted arrival time required for the vehicle to travel in a normal lane in the section, and, after that, calculates the predicted arrival time required for the vehicle to travel over the entire route, and notifies this total predicted arrival time to the control part 30. When a waypoint is set up on the route, the predicted arrival time required for the vehicle to travel before arriving at the waypoint is also calculated. Further, in step ST 15 in which the predicted arrival time calculating unit multiplies the predicted arrival time required for the vehicle to travel over the HOV lane section by 0.8 and, after that, calculates the predicted arrival time required for the vehicle to travel over the entire route, the value of 0.8 can be changed arbitrarily. After that, the navigation device advances the sequence to step ST17.

In contrast, when it is determined in step ST14 that no HOV lane exists on the route, the normal predicted time arrival required for the vehicle to travel over the entire route which does not take any HOV lane into consideration is calculated (step ST16). More specifically, the predicted arrival time calculating unit 41 calculates the predicted arrival time required for the vehicle to travel over the entire route, and notifies this predicted arrival time to the control part 30. After that, the navigation device advances the sequence to step ST17.

A process of displaying the predicted arrival time is carried out in step ST17. More specifically, the display processing unit 42 creates display data for displaying the predicted arrival time calculated by the predicted arrival time calculating unit 41 on the display unit 17. The display data created by this display processing unit 42 are sent to the display control unit 24 disposed within the control unit 18. The display control unit 24 creates a display signal on the basis of the display data, and sends the display signal to the display unit 17. As a result, when an HOV lane is included in the route, as shown in FIG. 4, the predicted arrival time calculated in consideration of travel in the HOV lane is displayed on a part of the screen of the display unit 17.

As previously explained, the navigation device in accordance with Embodiment 1 of the present invention can shorten the predicted arrival time required for the vehicle to travel before arriving at the destination when the vehicle will travel in an HOV lane because an HOV lane provides a faster traffic flow than a normal lane, the navigation device in accordance with Embodiment 1 of the present invention can bring the predicted arrival time close to the actual time which will elapse until the vehicle arrives at the destination.

Figure 4:
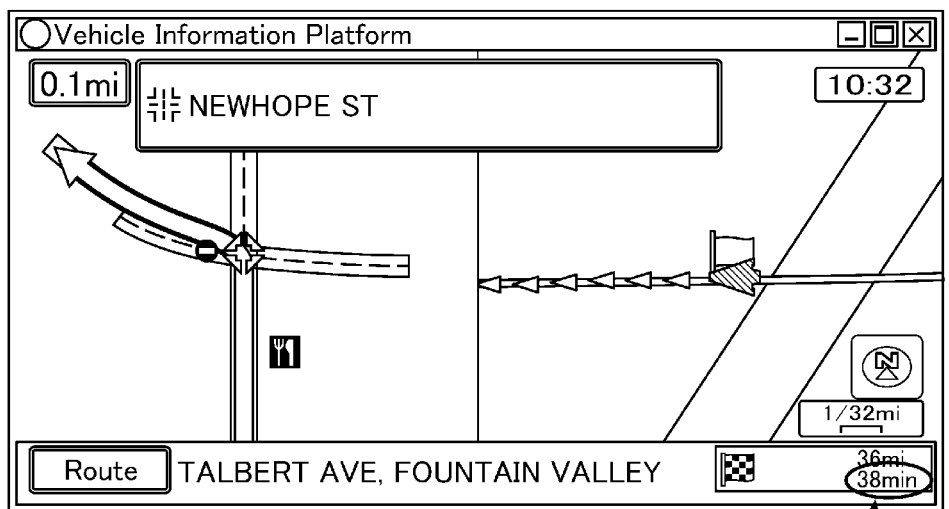
FIG. 4 is a view showing an example of a screen display produced by the navigation device in accordance with Embodiment 1 of the present invention.

Although the example in which the predicted arrival time is displayed on a part of the route guidance screen is shown in FIG. 4, the navigation device can be alternatively constructed in such a way as to display the predicted arrival time on another screen such as a route information display screen.
Embodiment 2.

For a route along which a vehicle travels while using an HOV lane, a navigation device in accordance with Embodiment 2 of the present invention predicts a higher degree of fuel efficiency than that for a route along which the vehicle travels while using only normal lanes.

Figure 5:
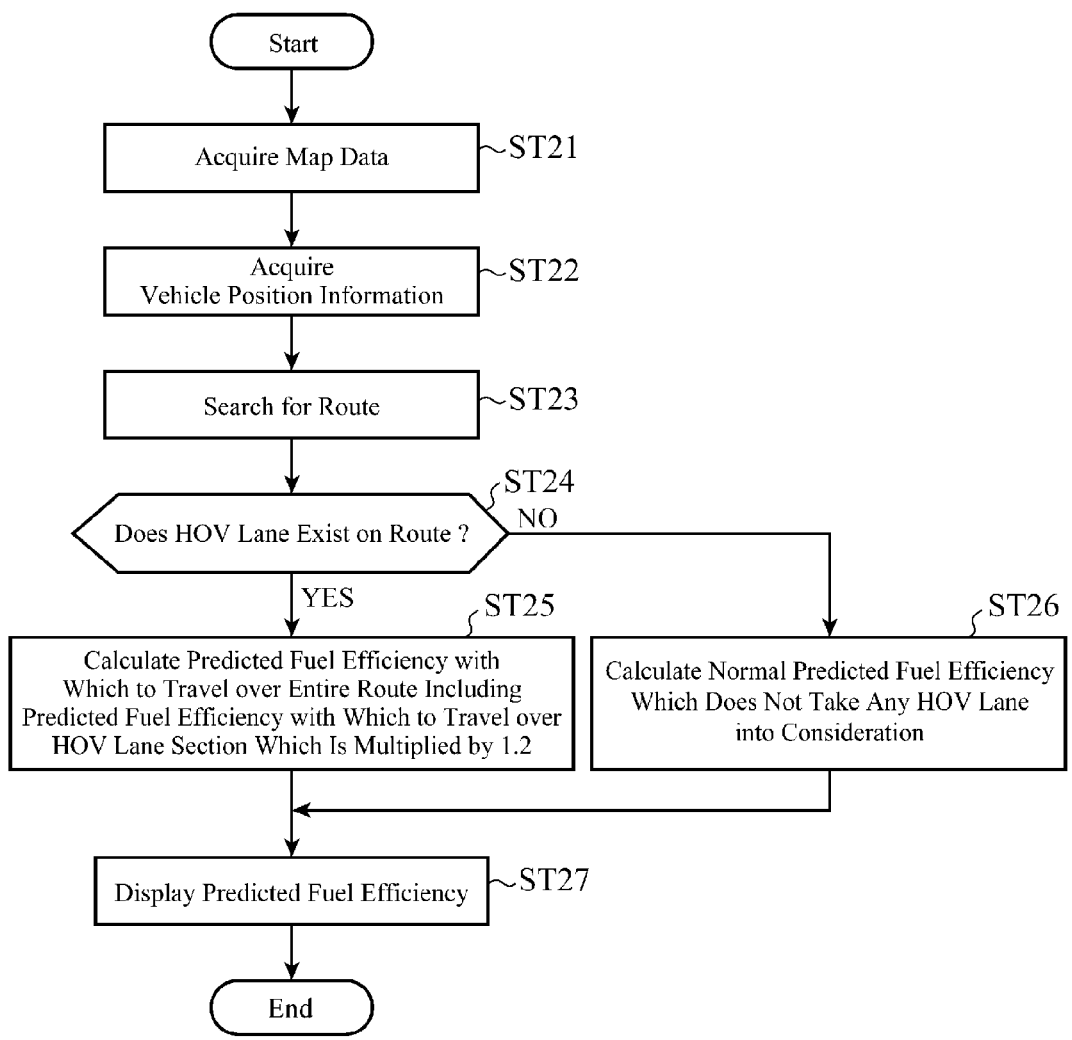
FIG. 5 is a flow chart showing the operation of a navigation device in accordance with Embodiment 2 of the present invention, focusing on a predicted fuel efficiency calculating process.

The navigation device in accordance with Embodiment 2 of the present invention has the same structure as the navigation device in accordance with above-mentioned Embodiment 1. Hereafter, the operation of the navigation device in accordance with this embodiment will be explained, focusing on a portion (operation) which is different from that of the navigation device in accordance with Embodiment 1. FIG. 5 is a flowchart showing the operation of the navigation device in accordance with Embodiment 2, focusing on a predicted fuel efficiency calculating process of calculating a predicted degree of fuel efficiency.

In this predicted fuel efficiency calculating process, map data are acquired first (step ST21). Vehicle position information is then acquired (step ST22). Then, a route search is carried out (step ST23). Whether or not an HOV lane exists on a route is then checked to see (step ST24). The above-mentioned processes of steps ST21 to ST24 are the same as those of steps ST11 to ST14 in the flow chart shown in above-mentioned FIG. 3, respectively.

When it is determined in this step ST24 that an HOV lane exists on the route, a predicted degree of fuel efficiency with which the vehicle will travel over the entire route is then calculated, the predicted degree of fuel efficiency including a predicted degree of fuel efficiency with which the vehicle will travel over the HOV lane section which is multiplied by 1.2 (step ST25). More specifically, because it is predicted that the vehicle can travel over the section in which the vehicle will travel in the HOV lane on the route more smoothly than the vehicle travels in a normal lane, a predicted fuel efficiency calculating unit 40 multiplies the predicted degree of fuel efficiency with which the vehicle will travel over the HOV lane section by 1.2 to set the predicted degree of fuel efficiency to be shorter than a predicted degree of fuel efficiency with which the vehicle will travel in a normal lane in the section, and, after that, calculates the predicted degree of fuel efficiency with which the vehicle will travel over the entire route, and notifies this predicted degree of fuel efficiency to a control part 30. When a waypoint is set up on the route, a predicted degree of fuel efficiency with which the vehicle will travel before arriving at the waypoint is also calculated. Further, in step ST25 in which the predicted fuel efficiency calculating unit multiplies the predicted degree of fuel efficiency with which the vehicle will travel over the HOV lane section by 1.2 and, after that, calculates the predicted degree of fuel efficiency with which the vehicle will travel over the entire route, the value of 1.2 can be changed arbitrarily. After that, the navigation device advances the sequence to step ST27.

In contrast, when it is determined in step ST24 that no HOV lane exists on the route, a normal predicted degree of fuel efficiency with which the vehicle will travel over the entire route which does not take any HOV lane into consideration is calculated (step ST26). More specifically, the predicted fuel efficiency calculating unit 40 calculates the predicted degree of fuel efficiency with which the vehicle will travel over the entire route, and notifies this predicted degree of fuel efficiency to the control part 30. After that, the navigation device advances the sequence to step ST27.

A process of displaying the predicted degree of fuel efficiency is carried out in step ST27. More specifically, a display processing unit 42 creates display data for displaying the predicted degree of fuel efficiency calculated by the predicted fuel efficiency calculating unit 40 on a display unit 17. The display data created by this display processing unit 42 are sent to a display control unit 24 disposed within a control unit 18. The display control unit 24 creates a display signal on the basis of the display data, and sends the display signal to the display unit 17. As a result, when an HOV lane is included in the route, as shown in FIG. 6, the predicted degree of fuel efficiency calculated in consideration of travel in the HOV lane is displayed on a part of the screen of the display unit 17.

As previously explained, the navigation device in accordance with Embodiment 2 of the present invention can increase the predicted degree of fuel efficiency with which the vehicle will travel before arriving at the destination when the vehicle travels in an HOV lane because an HOV lane provides a faster traffic flow than a normal lane, the navigation device in accordance with Embodiment 2 of the present invention can bring the predicted degree of fuel efficiency close to an actual degree of fuel efficiency with which the vehicle could actually travel before arriving at the destination.

Figure 6:
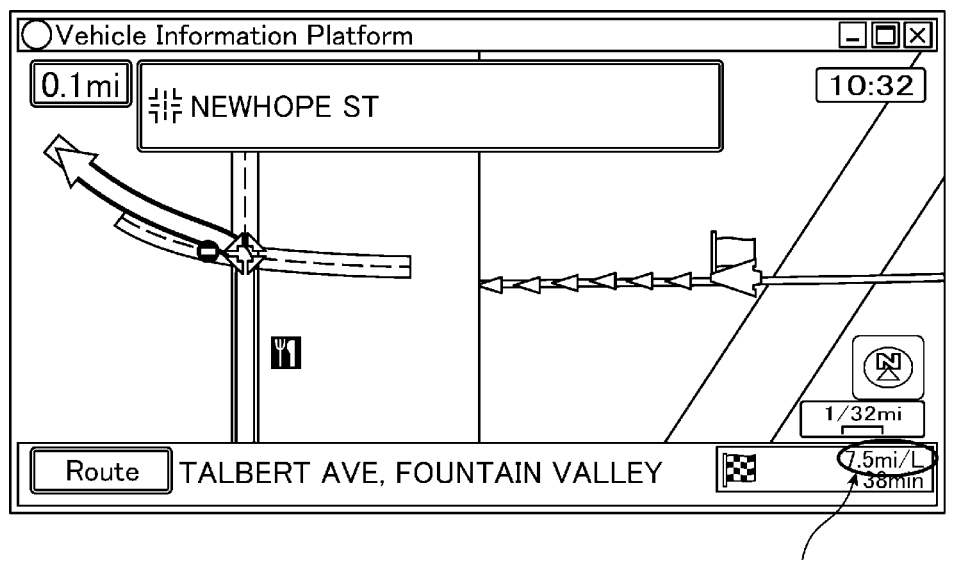
FIG. 6 is a view showing an example of a screen display produced by the navigation device in accordance with Embodiment 2 of the present invention.

Although the example in which the predicted degree of fuel efficiency is displayed on a part of the route guidance screen is shown in FIG. 6, the navigation device can be alternatively constructed in such a way as to display the predicted degree of fuel efficiency on a part of another screen such as a route information display screen.

Embodiment 3

A navigation device in accordance with this Embodiment 3 is constructed in such a way as to display a predicted time arrival and a predicted degree of fuel efficiency at a time of using an HOV lane and those at a time of not using any HOV lane for each of a plurality of routes searched for. The navigation device in accordance with Embodiment 3 of the present invention has the same structure as the navigation device in accordance with above-mentioned Embodiment 1. Hereafter, the operation of the navigation device in accordance with this embodiment will be explained, focusing on a portion (operation) which is different from those of the navigation devices in accordance with above-mentioned Embodiments 1 and 2.

Figure 7:
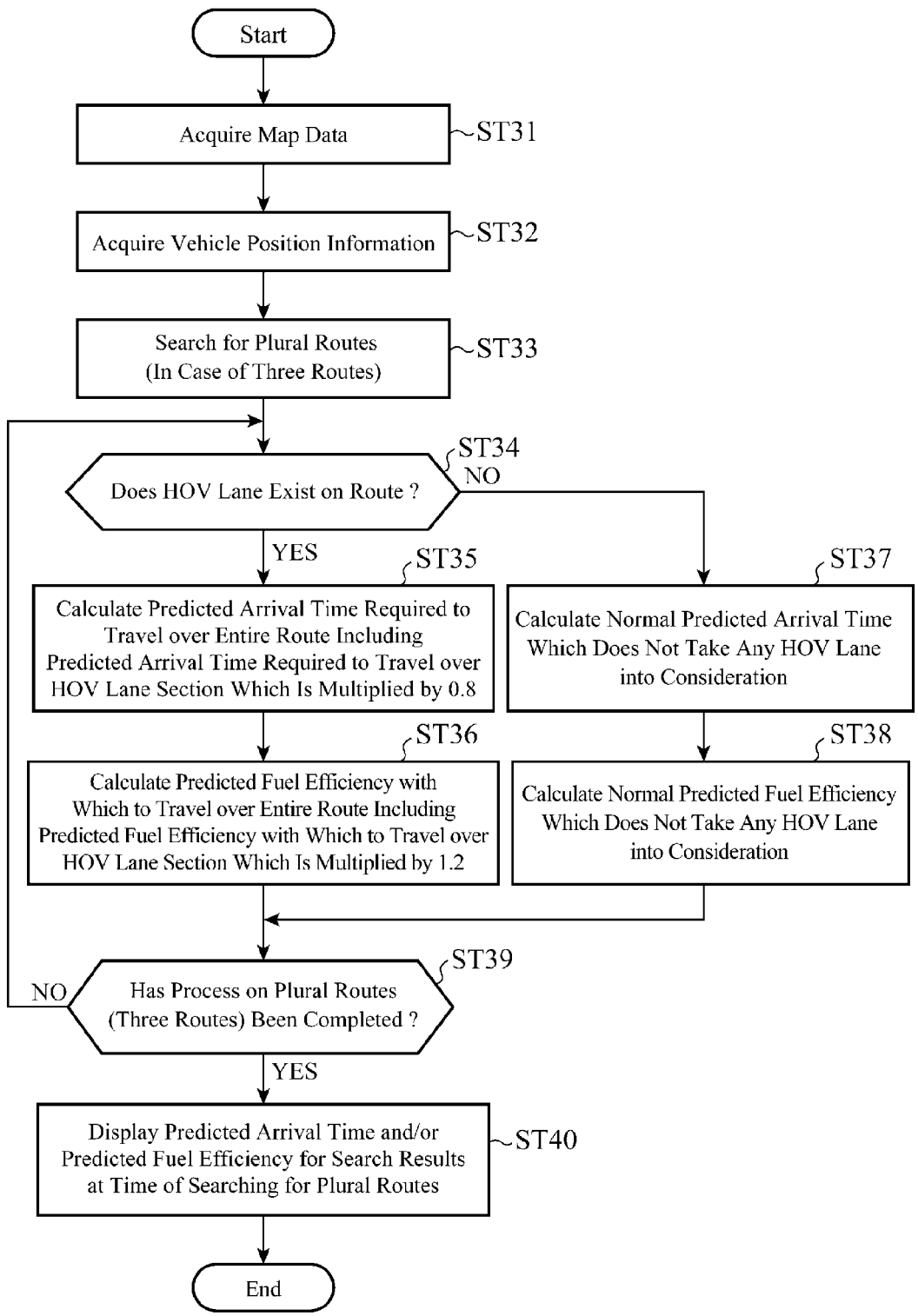
FIG. 7 is a flow chart showing the operation of a navigation device in accordance with Embodiment 3 of the present invention, focusing on a predicted arrival time calculating process and a predicted fuel efficiency calculating process.

FIG. 7 is a flow chart showing the operation of the navigation device in accordance with Embodiment 3, focusing on a predicted arrival time calculating process and a predicted fuel efficiency calculating process.

In these predicted arrival time calculating process and predicted fuel efficiency calculating process, map data are acquired first (step ST31). Vehicle position information is then acquired (step ST32). The above-mentioned processes of steps ST31 and ST32 are the same as those of steps ST21 and ST22 in the flow chart shown in above-mentioned FIG. 5, respectively.

A plurality of route searches are then carried out (step ST33). More specifically, a route searching unit 34 defines the current position of a vehicle shown by the vehicle position information sent from a control part 30 in step ST32 as a place of departure, and, in step ST31, searches for a plurality of routes to a destination inputted from an input unit 11 on the basis of the map data acquired from a map data acquiring unit 31. Hereafter, a case in which three routes have been searched for by the route searching unit will be explained as an example. The plurality of routes which this route searching unit 34 has searched for are informed to a route storage unit 35 as route data, and these route data are stored in the route storage unit.

Whether or not an HOV lane exists on a route is then checked to see (step ST34). More specifically, an HOV lane determining unit 36 extracts one yet-to-be-processed route from among the plurality of routes shown by the route data stored in the route storage unit 35, determines whether an HOV lane is included in this extracted route, and sends the result of the determination to a predicted arrival time calculating unit 41.

When it is determined in this step ST34 that an HOV lane exists on the route, a predicted arrival time required for the vehicle to travel over the entire route is calculated, the predicted arrival time including a predicted arrival time required for the vehicle to travel over the HOV lane section which is multiplied by 0.8 (step ST35). The process of this step ST35 is the same as that of step ST15 shown in FIG. 3. When a waypoint is set up on the route, a predicted arrival time required for the vehicle to travel before arriving at the waypoint is also calculated.

Then, a predicted degree of fuel efficiency with which the vehicle will travel over the entire route is calculated, the predicted degree of fuel efficiency including a predicted degree of fuel efficiency with which the vehicle will travel over the HOV lane section which is multiplied by 1.2 (step ST36). The process of this step ST36 is the same as that of step ST25 shown in FIG. 5. When a waypoint is set up on the route, a predicted degree of fuel efficiency with which the vehicle will travel before arriving at the waypoint is also calculated. After that, the navigation device advances the sequence to step ST39.

In contrast, when it is determined in above-mentioned step ST34 that no HOV lane exists on the route, a normal predicted time arrival required for the vehicle to travel over the entire route which does not take any HOV lane into consideration is calculated (step ST37). The process of this step ST37 is the same as that of step ST16 shown in FIG. 3. Then, a normal predicted degree of fuel efficiency with which the vehicle will travel over the entire route which does not take any HOV lane into consideration is calculated (step ST38). The process of this step ST38 is the same as that of step ST26 shown in FIG. 5. After that, the navigation device advances the sequence to step ST39.

It is checked to see, in step ST39, whether the process on each of the plurality of routes (the three routes) has been completed. When it is determined in this step ST39 that the process on each of the plurality of routes has not been completed, the navigation device returns the sequence to step ST34 and repeats the above-mentioned processes.

Figure 8:
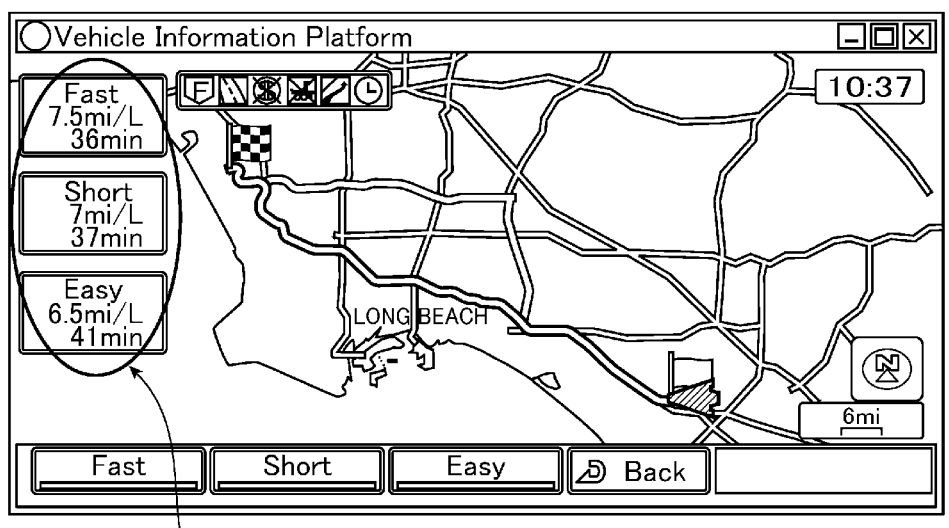
FIG. 8 is a view showing an example of a screen display produced by the navigation device in accordance with Embodiment 3 of the present invention.

In contrast, when it is determined in step ST39 that the process on each of the plurality of routes has been completed, the predicted arrival time and/or the predicted degree of fuel efficiency is displayed for each of the search results acquired at the time of searching for the plurality of routes (step ST40). More specifically, a display processing unit 42 creates both display data for displaying the predicted arrival time calculated by the predicted arrival time calculating unit 41 on a display unit 17, and display data for displaying the predicted degree of fuel efficiency calculated by a predicted fuel efficiency calculating unit 40 on the display unit 17. The display data created by this display processing unit 42 are sent to a display control unit 24 disposed within a control unit 18. The display control unit 24 creates a display signal on the basis of the display data, and sends the display signal to the display unit 17. As a result, when each of routes includes an HOV lane, the predicted arrival time and the predicted degree of fuel efficiency which are calculated in consideration of travel in the HOV lane are displayed on a part of the screen of the display unit 17, as shown in FIG. 8.

Although the navigation device in accordance with this embodiment is constructed in such a way as to display both the predicted arrival time and the predicted degree of fuel efficiency on the screen of the display unit 17, the navigation device can be alternatively constructed in such a way as to display only one of them on the screen. Further, in step ST35 in which the predicted arrival time calculating unit multiplies the predicted arrival time required for the vehicle to travel over the HOV lane section by 0.8 and, after that, calculates the predicted arrival time required for the vehicle to travel over the entire route, the value of 0.8 can be changed arbitrarily. Further, in step ST36 in which the predicted fuel efficiency calculating unit multiplies the predicted degree of fuel efficiency with which the vehicle will travel over the HOV lane section by 1.2 and, after that, the predicted degree of fuel efficiency with which the vehicle will travel over the entire route, the value of 1.2 can be changed arbitrarily.

Embodiment 4

A navigation device in accordance with Embodiment 4 of the present invention is constructed in such a way as to perform a search for a route according to a search mode by taking into consideration the positions of entrances and exits of HOV lanes which the navigation device uses as a route. The navigation device in accordance with Embodiment 4 of the present invention has the same structure as the navigation device in accordance with above-mentioned Embodiment 1. Hereafter, the operation of the navigation device in accordance with this embodiment will be explained, focusing on a portion (operation) which is different from that of the navigation device in accordance with Embodiment 1.

Figure 9:
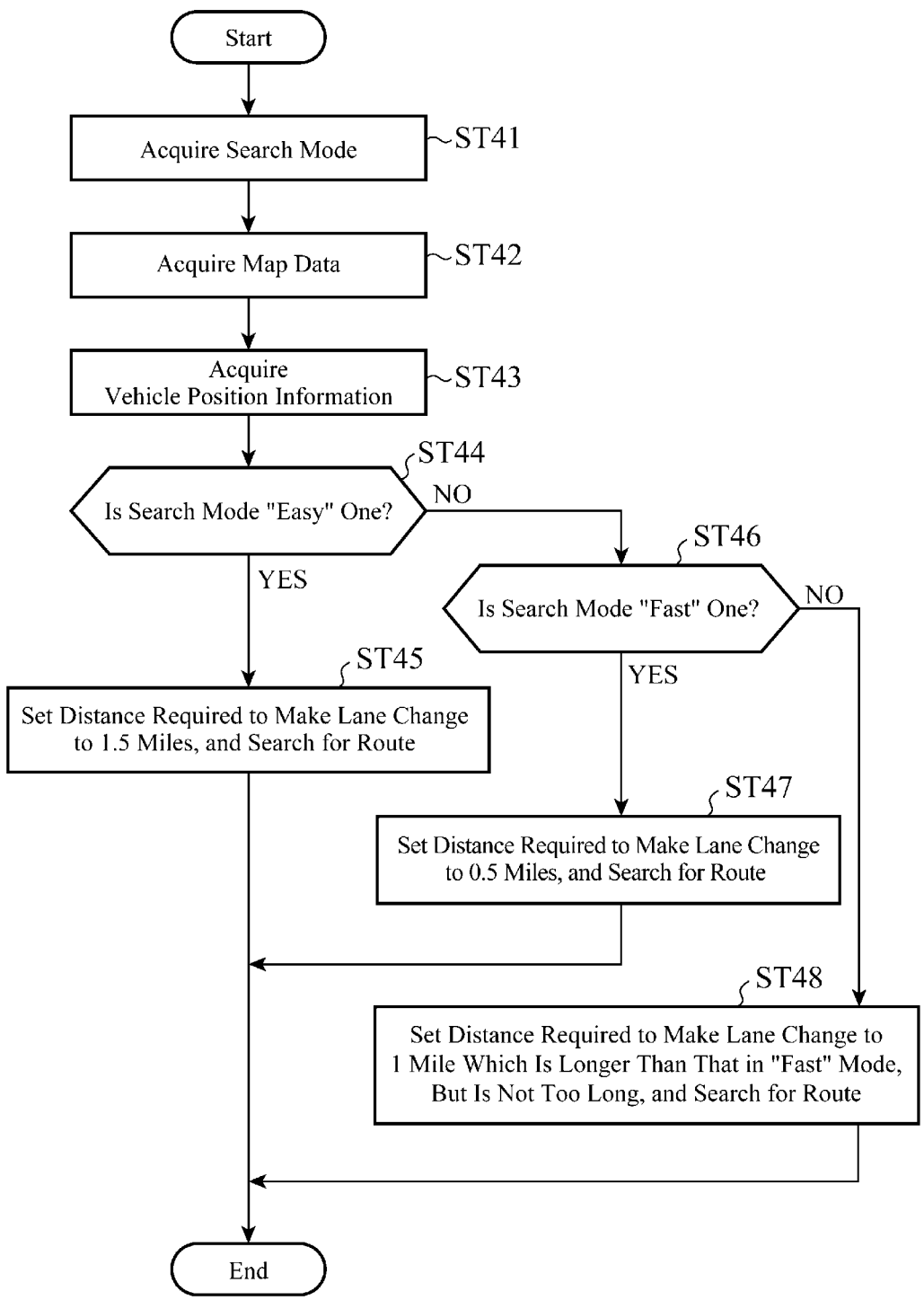
FIG. 9 is a flow chart showing the operation of a navigation device in accordance with Embodiment 4 of the present invention, focusing on a route search process.

FIG. 9 is a flow chart showing the operation of the navigation device in accordance with Embodiment 4, focusing on a route search process. In the route search process, a search mode is acquired (step ST41). More specifically, a search mode determining unit 33 determines a search mode at a time when a route searching unit 34 performs a search for a route in response to an instruction from a control part 30, and sends the result of the determination to a route searching unit 34. It is assumed that search modes in the navigation device in accordance with this Embodiment 4 include an "Easy" mode, a "Fast" mode, and a "short" mode The "Easy" mode is the one for poor drivers in which the navigation device presents a route along which a user will drive his or her vehicle relatively easily, such as a route which is a somewhat-circuitous route, but which provides a smaller number of times that the user makes a right or left turn, to the user on a priority basis. Further, the "Fast" mode is the one in which the navigation device presents a route which enables the user to arrive at his or her destination as early as possible to the user on a priority basis. In addition, the "short" mode is the one in which the navigation device presents a route which enables the user to arrive at his or her destination after travelling the shortest distance to the destination to the user on a priority basis.

Map data are then acquired (step ST42). The process of this step ST42 is the same as that of step ST11 shown in FIG. 3. Vehicle position information is then acquired (step ST43). The process of this step ST43 is the same as that of step ST12 shown in FIG. 3.

It is then checked to see whether or not the search mode determined in step ST41 is the "Easy" one (step ST44). When it is determined in this step ST44 that the search mode is the "Easy" one, a route search is then carried out by setting a distance required to make a lane change to 1.5 miles (step ST45). More specifically, when the search mode determining unit 33 determines that the search mode is the "Easy" one, the route searching unit 34 selects an entrance and an exit of an HOV lane extracted by an HOV lane entrance/exit extracting unit 37, and searches for a route leading from a place of departure using the entrance and the exit of the selected HOV lane to a destination on the basis of the map data acquired by a map data acquiring unit 31. More concretely, the route searching unit 34 performs a route search while allocating 1.5 miles (a distance sufficient for lane changes), as the distance (lane change section) required to make a lane change, to both a distance required to enter the HOV lane after entering the highway and changing to a high-speed main line, and a distance required to reach an exit of the highway after exiting the HOV lane. In this route search process, when the distance required to make a lane change of the lane change section for the HOV lane is shorter than 1.5 miles, the route searching unit can perform a route search not using the HOV lane. After that, the route searching unit ends the route search process.

When it is determined in above-mentioned step ST44 that the search mode is not the "Easy" one, it is then checked to see whether or not the search mode determined in step ST41 is the "Fast" one (step ST46). When it is determined in this step ST46 that the search mode is the "Fast" one, a route search is then carried out by setting the distance required to make a lane change to 0.5 miles (step ST47). More specifically, when the search mode determining unit 33 determines that the search mode is the "Fast" one, the route searching unit 34 selects an entrance and an exit of the HOV lane extracted by the HOV lane entrance/exit extracting unit 37, and searches for a route leading from the place of departure using the entrance and the exit of the selected HOV lane to the destination on the basis of the map data acquired by the map data acquiring unit 31. More concretely, the route searching unit 34 performs a route search while allocating 0.5 miles (the shortest distance required to make a lane change), as the distance required to make a lane change, to both the distance required to enter the HOV lane after entering the highway and changing to a high-speed main line, and the distance required to reach an exit of the highway after exiting the HOV lane. After that, the route searching unit ends the route search process.

When it is determined in above-mentioned step ST46 that the search mode is not the "Fast" one, a route search is then carried out by setting the distance required to make a lane change to 1 mile (step ST48). More specifically, when the search mode determining unit 33 determines that the search mode is not the "Fast" one, the route searching unit 34 selects an entrance and an exit of the HOV lane extracted by the HOV lane entrance/exit extracting unit 37, and searches for a route leading from the place of departure using the entrance and the exit of the selected HOV lane to the destination on the basis of the map data acquired by the map data acquiring unit 31. More concretely, the route searching unit 34 performs a route search while allocating 1 mile which is longer than that in the "Fast" mode, but is not too long, as the distance required to make a lane change, to both the distance required to enter the HOV lane after entering the highway and changing to a high-speed main line, and the distance required to reach an exit of the highway after exiting the HOV lane. After that, the route searching unit ends the route search process.

As previously explained, because in the case of the Easy mode, the navigation device in accordance with Embodiment 4 of the present invention provides a route along which the user will enter an HOV lane after providing the route with a sufficiently long section in which the user can make a lane change, or provides a route along which the user will not use any HOV lane (i.e. a route which does not urge the user to make a lane change), the navigation device provides safe guidance for poor drivers. Further, in the case of the Fast mode, the navigation device in accordance with Embodiment 4 of the present invention can provide a route along which the user will enter an HOV lane in consideration of a lane change section which has a length to such an extent that no danger is posed to the user even though the user makes a somewhat sudden lane change, and which enables the user to arrive at his or her destination as early as possible.

The following values: 1.5 miles, 1 mile, and 0.5 miles each defined as the length of the above-mentioned lane change section are examples, and those values can be set arbitrarily. More specifically, the lane change section is set to have the longest length in the case of the Easy mode, is set to have the shortest length in the case of the Fast mode, and is set to have a length intermediate between the longest and shortest lengths in the case of the short mode.

Embodiment 5

A navigation device in accordance with Embodiment 5 of the present invention is constructed in such a way as to perform a route search in consideration of use or non-use of an HOV lane depending upon a search mode. The navigation device in accordance with Embodiment 5 of the present invention has the same structure as the navigation device in accordance with above-mentioned Embodiment 1. Hereafter, the operation of the navigation device in accordance with this embodiment will be explained, focusing on a portion (operation) which is different from that of the navigation device in accordance with Embodiment 4.

Figure 10:
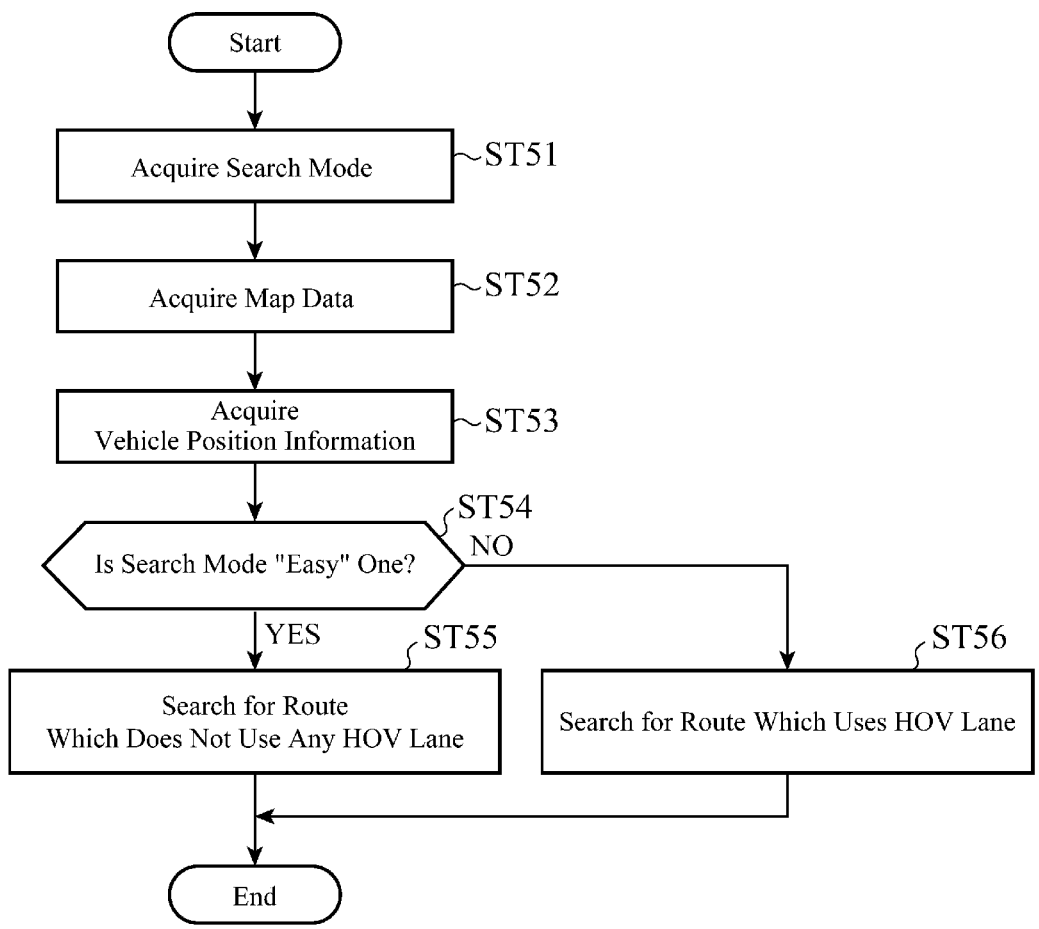
FIG. 10 is a flow chart showing the operation of a navigation device in accordance with Embodiment 5 of the present invention, focusing on a route search process.

FIG. 10 is a flow chart showing the operation of the navigation device in accordance with Embodiment 5, focusing on a route search process. In the route search process, a search mode is acquired (step ST51). Map data are then acquired (step ST52). Vehicle position information is then acquired (step ST53). It is then checked to see whether or not the search mode determined in step ST51 is an "Easy" one (step ST54). The processes of above-mentioned steps ST51 to ST54 are the same as those of steps ST41 to ST44 of the flow chart shown in above-mentioned FIG. 9, respectively.

When it is determined in above-mentioned step ST54 that the search mode is the "Easy" one, a route search using no HOV lane is then carried out (step ST55). More specifically, when a search mode determining unit 33 determines that the search mode is the "Easy" one, a route searching unit 34 searches for a route from a place of departure which does not use an entrance and an exit of an HOV lane extracted by an HOV lane entrance/exit extracting unit 37 to a destination according to the map data acquired by a map data acquiring unit 31. After that, the route searching unit ends the route search process.

In contrast, when it is determined in above-mentioned step ST54 that the search mode is not the "Easy" one, a route search using an HOV lane is then carried out (step ST56). More specifically, when the search mode determining unit 33 determines that the search mode is not the "Easy" one, the route searching unit 34 searches for a route from a place of departure which uses an entrance and an exit of the HOV lane extracted by the HOV lane entrance/exit extracting unit 37 to the destination according to the map data acquired by a map data acquiring unit 31. After that, the route searching unit ends the route search process.

As previously explained, in the case of the Easy mode, the navigation device in accordance with Embodiment 5 of the present invention can present a route which does not use any HOV lane which necessitates the user to make a lane change, but enables the user to easily drive the vehicle to the user. In contrast, in a case in which the search mode is not the Easy mode (the search mode is a Fast mode), the navigation device in accordance with Embodiment 5 of the present invention can present a route which uses an HOV lane as much as possible, and which enables the user to arrive at his or her destination as early as possible to the user.

Embodiment 6

A navigation device in accordance with Embodiment 6 of the present invention is constructed in such a way as to search for a route which takes into consideration the positions of entrances and exits of an HOV lane which is used as a route according to traffic jam conditions. The navigation device in accordance with Embodiment 6 of the present invention has the same structure as the navigation device in accordance with above-mentioned Embodiment 1. Hereafter, the operation of the navigation device in accordance with this embodiment will be explained, focusing on a portion (operation) which is different from that of the navigation device in accordance with Embodiment 1.

Figure 11:
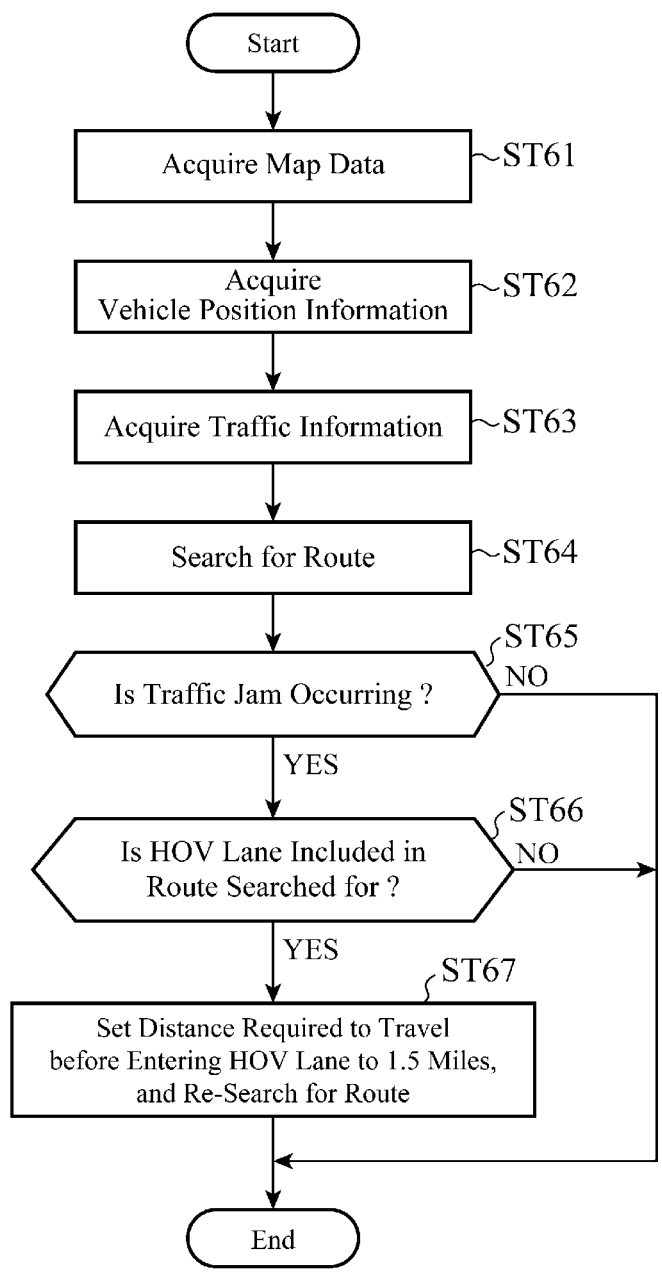
FIG. 11 is a flow chart showing the operation of a navigation device in accordance with Embodiment 6 of the present invention, focusing on a route search process.

FIG. 11 is a flow chart showing the operation of the navigation device in accordance with Embodiment 6, focusing on a route search process. In the route search process, map data are acquired first (step ST61). Vehicle position information is then acquired (step ST62). The processes of these steps ST61 and ST62 are the same as those of steps ST11 and ST12 shown in FIG. 3, respectively.

Traffic information is then acquired (step ST63). More specifically, a traffic state determining unit 39 acquires traffic information about an area in front of a vehicle and traffic information about an area in the vicinity of the vehicle from a traffic information receiver 15 by using both the map data acquired in step ST61 and the vehicle position information acquired in step ST62.

A route search is then carried out (step ST64). More specifically, a route searching unit 34 searches for a route leading from a place of departure to a destination on the basis of the map data acquired by a map data acquiring unit 31 by using the map data acquired in step ST61, the vehicle position information acquired in step ST62, and the traffic information acquired in step ST63.

Whether or not a traffic jam is occurring is then checked to see (step ST65). More specifically, a traffic state determining unit 39 determines a traffic volume or the like at a time of occurrence of a traffic jam on the basis of the traffic information sent thereto from the traffic information receiver 15, and sends the result of this determination to a control part 30. The control part 30 checks to see whether or not a traffic jam is occurring in the area in front of the vehicle and in the area in the vicinity of the vehicle on the basis of the determination result which the control part has received. When it is determined in this step ST65 that no traffic jam is occurring, the route searching process is then ended.

In contrast, when it is determined in step ST65 that a traffic jam is occurring, it is then checked to see whether or not an HOV lane is included in the route searched for (step ST66). When it is determined in this step ST66 that no HOV lane is included in the route searched for, the route search process is ended.

In contrast, when it is determined in step ST66 that an HOV lane is included in the route searched for, a distance required for the vehicle to travel before entering the HOV lane is set to 1.5 miles, and a re-search for a route is then carried out (step ST67). More specifically, the route searching unit 34 uses an entrance and an exit of the HOV lane extracted by an HOV lane entrance/exit extracting unit 37 to search for a route leading from the place of departure to the destination on the basis of the map data acquired by the map data acquiring unit 31. More concretely, the route searching unit 34 performs a re-search for a route with the distance required for the vehicle to travel before entering the HOV lane (a distance required to make a lane change) being set to 1.5 miles (a sufficiently long distance). 1.5 miles in this case is an example, and, when a traffic jam is occurring, the distance required to make a lane change can be set arbitrarily in such a way as to be longer than that at a time when no traffic jam is occurring. Then, the route search process is ended.

As explained above, the navigation device in accordance with Embodiment 6 of the present invention is constructed in such a way as to perform a re-search for a route which provides a section having a sufficiently long distance in which the user can make a lane change to an entrance to an HOV lane when a traffic jam is occurring. Therefore, the navigation device in accordance with Embodiment 6 of the present invention enables the user to easily make a lane change to an HOV lane when a traffic jam is occurring. Although the example in which the navigation device, in step ST65 of FIG. 11, determines whether or not a traffic jam is occurring according to the presence or absence of the traffic jam is shown. For example, the navigation device can be alternatively constructed in such a way as to determine whether or not a traffic jam is occurring according to a degree of traffic jam (determine whether or not the degree of traffic jam is equal to or higher than a predetermined degree of traffic jam or whether or not the degree of traffic jam is higher than a predetermined degree of traffic jam).

Embodiment 7

A navigation device in accordance with Embodiment 7 of the present invention searches for a route which uses an HOV lane as much as possible when a traffic jam is occurring, whereas when no traffic jam is occurring, the navigation device searches for a route which does not use any HOV lane. The navigation device in accordance with Embodiment 7 of the present invention has the same structure as the navigation device in accordance with above-mentioned Embodiment 1. Hereafter, the operation of the navigation device in accordance with this embodiment will be explained, focusing on a portion (operation) which is different from that of the navigation device in accordance with Embodiment 1.

Figure 12:
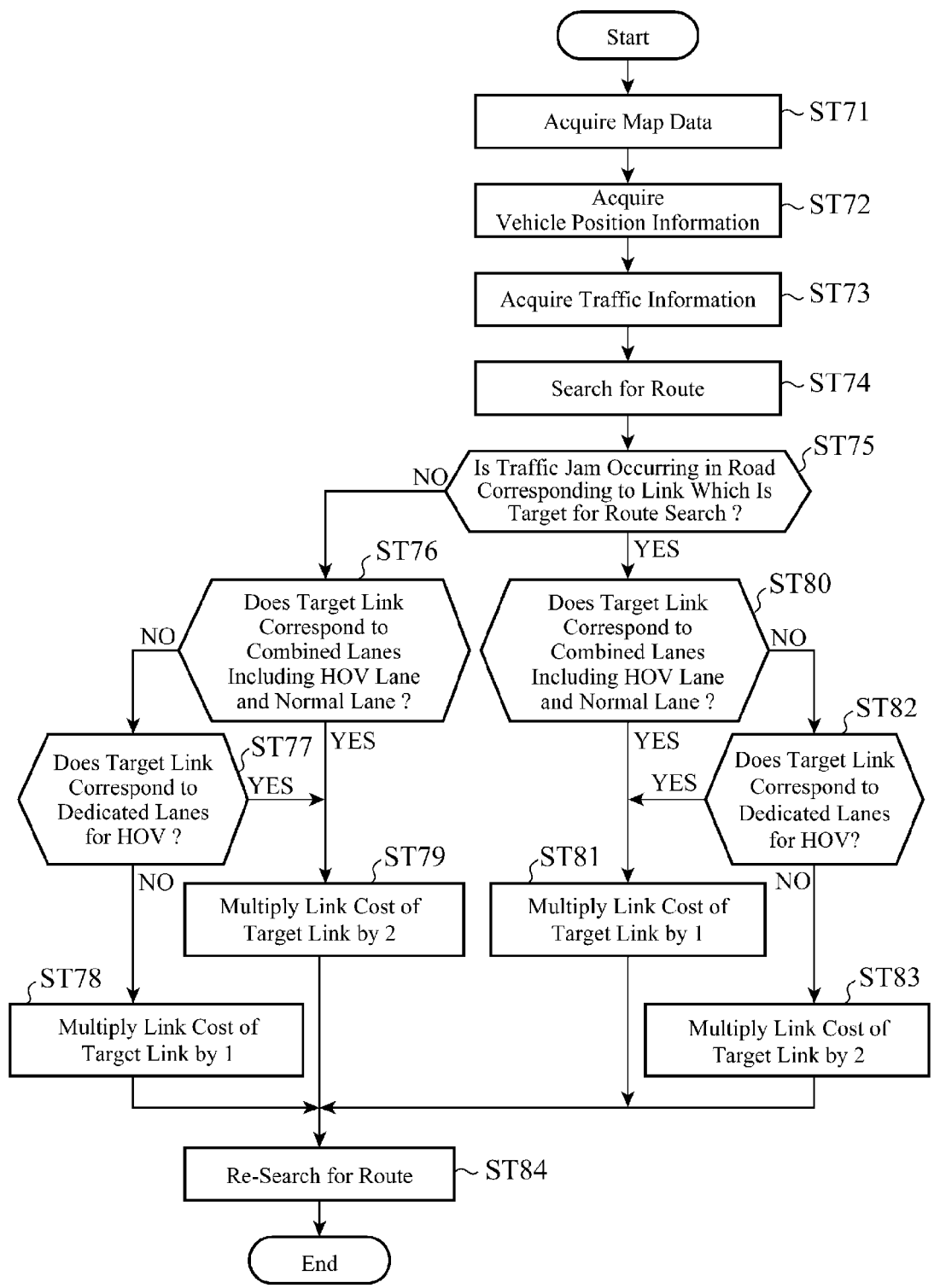
FIG. 12 is a flow chart showing the operation of a navigation device in accordance with Embodiment 7 of the present invention, focusing on a route search process.

FIG. 12 is a flow chart showing the operation of the navigation device in accordance with Embodiment 7, focusing on a route search process. In the route search process, map data are acquired first (step ST71). Vehicle position information is then acquired (step ST72). Traffic information is then acquired (step ST73). A route search is then carried out (step ST74). The processes of steps ST71 to ST74 are the same as those of steps ST61 to ST64 shown in above-mentioned FIG. 11, respectively.

Whether or not a traffic jam is occurring in a road corresponding to a link which is a target for the route search is then checked to see (step ST75). More specifically, a traffic state determining unit 39 determines a traffic volume or the like at a time of occurrence of a traffic jam on the basis of the traffic information sent thereto from a traffic information receiver 15, and sends the result of this determination to a control part 30. The control part 30 checks to see whether or not a traffic jam is occurring in an area in front of a vehicle and in an area in the vicinity of the vehicle on the basis of the determination result which the control part has received.

When it is determined in this step ST65 that no traffic jam is occurring, it is then checked to see whether the target link corresponds to combined lanes including an HOV lane and a normal lane (step ST76). When it is determined in this step ST76 that the target link does not correspond to combined lanes including an HOV lane and a normal lane, it is then checked to see whether the target link corresponds to dedicated lanes for HOV (step ST77). When it is determined in this step ST77 that the target link does not correspond to dedicated lanes for HOV, the link cost of the target link is multiplied by 1 (step ST78). Multiplying the link cost by 1 means that the link cost is set to have a value assuming that a route which uses normal lanes is to be searched for when a traffic jam is not occurring. After that, the navigation device advances the sequence to step ST84.

When it is determined in above-mentioned step ST76 that the target link corresponds to combined lanes including an HOV lane and a normal lane, and when it is determined in step ST77 that the target link corresponds to dedicated lanes for HOV, the link cost of the target link is multiplied by 2 (step ST79). Multiplying the link cost by 2 means that the link cost is set to have a value assuming that the use of normal lanes without using any HOV lane takes priority when a traffic jam is not occurring. After that, the navigation device advances the sequence to step ST84.

When it is determined in above-mentioned step ST75 that a traffic jam is occurring in a road corresponding to the link which is a target for route search, it is then checked to see whether the target link corresponds to combined lanes including an HOV lane and a normal lane (step ST80). When it is determined in this step ST80 that the target link does not correspond to combined lanes including an HOV lane and a normal lane, it is then checked to see whether the target link corresponds to dedicated lanes for HOV (step ST82). When it is determined in this step ST82 that the target link does not correspond to dedicated lanes for HOV, the link cost of the target link is multiplied by 2 (step ST83). Multiplying the link cost by 2 means that the link cost is set to have a value assuming that the use of an HOV lane rather than normal lanes takes priority when a traffic jam is occurring. After that, the navigation device advances the sequence to step ST84.

When it is determined in above-mentioned step ST82 that the target link corresponds to dedicated lanes for HOV, and when it is determined in above-mentioned step ST80 that the target link corresponds to combined lanes including an HOV lane and a normal lane, the link cost of the target link is multiplied by 1 (step ST81). Multiplying the link cost by 1 means that the link cost is set to have a value assuming that a route which uses an HOV lane is to be searched for when a traffic jam is occurring. After that, the navigation device advances the sequence to step ST84.

After the cost is determined in the above-mentioned way, a re-search of a route using this cost is carried out in step ST84.

Then, the route search process is ended. Through the above-mentioned processes, a route which gives a higher priority to the use of HOV lanes is searched for when a traffic jam is occurring. Further, the link cost multiplied by 1 or 2 in the above-mentioned process can be changed according to the presence or absence of a traffic jam, and an adjustment of whether to use either an HOV lane or a normal lane according to the degree of traffic jam can be made. As a result, there can be a case in which a route which does not use any HOV lane at all is searched for when no traffic jam is occurring.

As previously explained, even when a traffic jam is occurring, the navigation device in accordance with Embodiment 7 of the present invention can perform a route search using HOV lanes as much as possible because HOV lanes are less crowded than normal lanes in many cases. Further, when no traffic jam is occurring, the navigation device can perform a route search not using any HOV lane to recommend the user not to make an unnecessary lane change because normal lanes are also not crowded.

Embodiment 8

In a case in which a highway is included in a route which is proposed for a user when performing a route search, a navigation device in accordance with Embodiment 8 of the present invention performs the search for a route by dividing the route into the following three sections.

(1) A section leading from a place of departure to an entrance of the highway which is the nearest to the place of departure.

(2) A section leading from a destination to an exit of the highway which is the nearest to the destination.

(3) A section of the highway leading from the entrance determined in (1) to the exit determined in (2).

In this case, the navigation device determines the presence or absence of an HOV lane and the usable or unusable of the HOV lane, and then determines whether to use either the HOV lane or a normal lane.

When a waypoint is set up, the above-mentioned route search is carried out for both a section leading from the place of departure to the waypoint and a section leading from the waypoint to the destination.

The navigation device in accordance with Embodiment 8 of the present invention has the same structure as the navigation device in accordance with above-mentioned Embodiment 1. Hereafter, the operation of the navigation device in accordance with this embodiment will be explained, focusing on a portion (operation) which is different from that of the navigation device in accordance with Embodiment 1.

Figure 13:
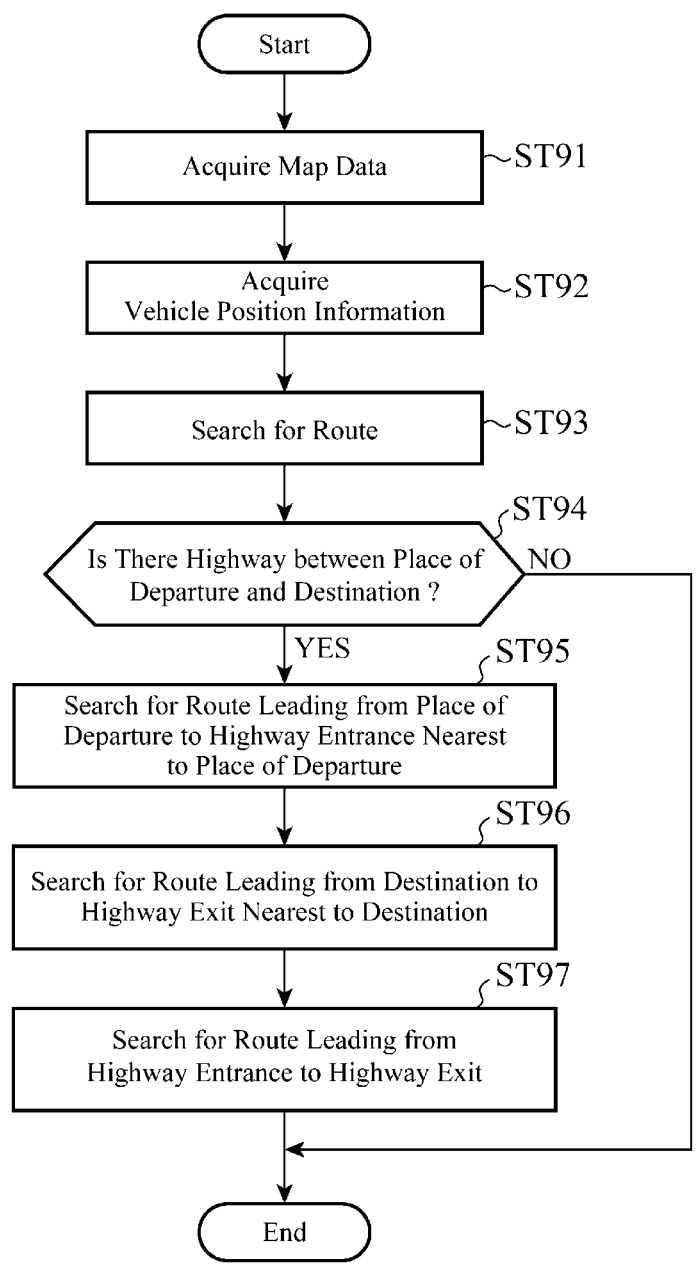
FIG. 13 is a flow chart showing the operation of a navigation device in accordance with Embodiment 8 of the present invention, focusing on a route search process.

FIG. 13 is a flow chart showing the operation of the navigation device in accordance with Embodiment 8, focusing on a route search process. In the route search process, map data are acquired first (step ST91). Vehicle position information is then acquired (step ST92). A route search is then carried out (step ST93). The processes of steps ST91 to ST93 are the same as those of steps ST11 to ST13 shown in above-mentioned FIG. 3, respectively. In the route search process of step ST93, a route search in which no restriction is imposed on a route (when a route passing through a highway is selected, a vehicle is assumed to travel in a normal lane even when traveling the highway) is carried out.

It is then checked to see whether there is a highway between the place of departure and the destination (step ST94). More specifically, a route searching unit 34 checks to see whether or not a highway is included between the place of departure and the destination of the route which has been searched for in step ST93. When it is determined in this step ST94 that there is no highway between the place of departure and the destination, the route which has been searched for in step ST93 is used because no route re-search is needed. After that, the route search process is ended.

In contrast, when it is determined in step ST94 that there is a highway between the place of departure and the destination, a search for a route from the place of departure to the entrance of the highway which is the nearest to the place of departure is then carried out (step ST95). More specifically, the route searching unit 34 performs a search for a route leading from the place of departure (e.g. the current position of the vehicle) to the entrance of the highway which is the nearest to the place of departure.

A search for a route from the destination to the exit of the highway which is the nearest to the destination is then carried out (step ST96). More specifically, the route searching unit 34 performs a search for a route leading from the destination to the exit of the highway which is the nearest to the destination. A search for a route leading from the entrance of the highway to the exit of the highway is then carried out (step ST97). More specifically, the route searching unit 34 performs a search for a route between the entrance of the highway used in step ST95 and the exit of the highway used in step ST96. In the route search of this step ST97, when the used highway includes an HOV lane or an EXPRESS lane, a route search which also takes into consideration the use or non-use of the highway is carried out. As a result, a re-search for an appropriate route is carried out through these processes of steps ST95 to ST97.

As explained above, while because a conventional route search provides a route which uses an HOV lane, there is a case in which a route which urges the user to take a circuitous way without entering a highway from a nearby highway entrance is presented to the user, the navigation device in accordance with Embodiment 8 of the present invention can search for a route which urges the user to enter a highway from a nearby highway entrance suitable for the user's use, which can guide the user to an HOV lane appropriately, and which urges the user to exit the highway from the exit of the highway which is the nearest to the destination. When performing a search for a route which uses an HOV lane, the navigation device needs to determine a highway entrance and a highway exit which the navigation device uses by also making a comparison with entrances/exits exclusively for the HOV lane, in addition to making a selection from normal highway entrances and normal highway exits.

Embodiment 9

A navigation device in accordance with Embodiment 9 of the present invention is constructed in such a way as to, when determining that a highway is included in a route between a place of departure and a destination which the navigation device proposes to a user in performing a route search, perform a search for a route not using any HOV lane between the place of departure and the destination, and, after that, determine the presence or absence of an HOV lane in the highway and the usable or unusable of the HOV lane to determine whether or not to use the HOV lane, and determine an entire route according to this determination. When a waypoint is set up, the above-mentioned route search is carried out for both a section leading from the place of departure to the waypoint and a section leading from the waypoint to the destination.

The navigation device in accordance with Embodiment 9 of the present invention has the same structure as the navigation device in accordance with above-mentioned Embodiment 8. Hereafter, the operation of the navigation device in accordance with this embodiment will be explained, focusing on a portion (operation) which is different from that of the navigation device in accordance with Embodiment 8.

Figure 14:
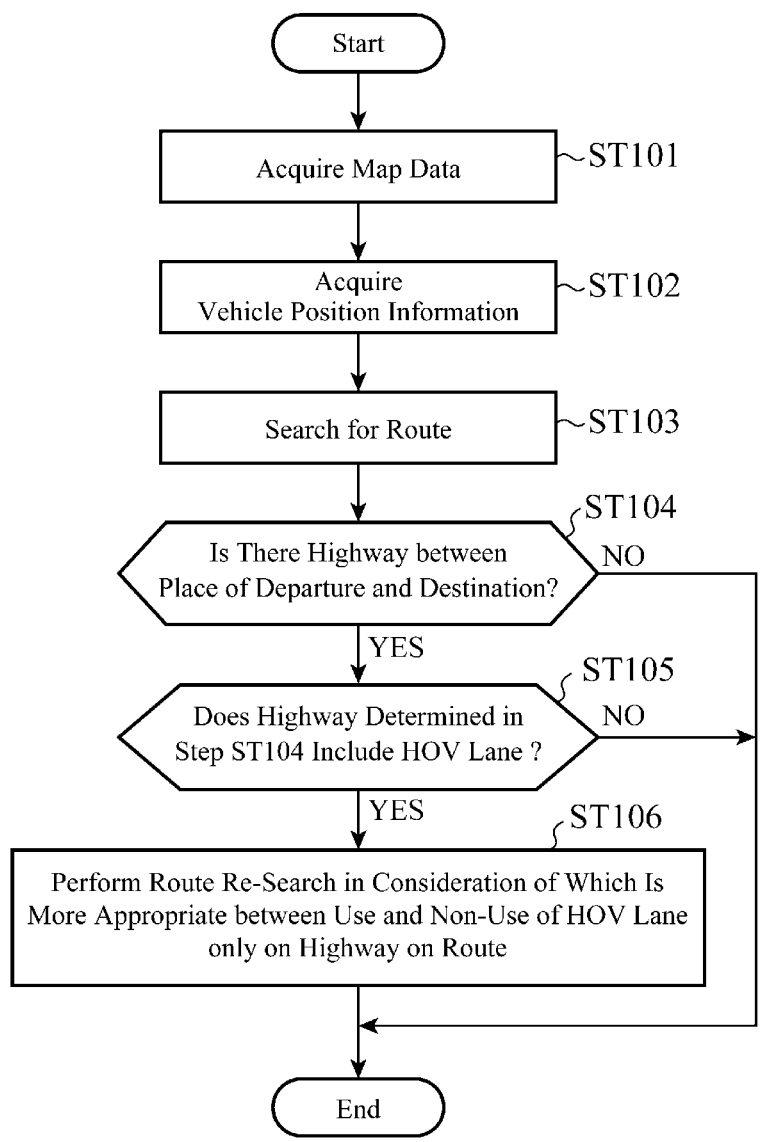
FIG. 14 is a flow chart showing the operation of a navigation device in accordance with Embodiment 9 of the present invention, focusing on a route search process.

FIG. 14 is a flow chart showing the operation of the navigation device in accordance with Embodiment 9, focusing on a route search process. In the route search process, map data are acquired first (step ST101). Vehicle position information is then acquired (step ST102). A route search is then carried out (step ST103). It is then checked to see whether there is a highway between the place of departure and the destination. The processes of steps ST101 to ST104 are the same as those of steps ST91 to ST94 shown in above-mentioned FIG. 13, respectively.

When it is determined in above-mentioned step ST104 that there is no highway between the place of departure and the destination, the route which has been searched for in step ST103 is used because no route re-search is needed. After that, the route search process is ended. In contrast, when it is determined in step ST104 that there is a highway between the place of departure and the destination, it is then checked to see whether the highway includes an HOV lane (step ST105). When it is determined in this step ST105 that no HOV lane exists in the highway on the route, the route which has been searched for in step ST103 is used because no route re-search is needed. After that, the route search process is ended.

In contrast, when it is determined in step ST105 that an HOV lane exists in the highway on the route, a route re-search in consideration of which is more appropriate between the use and non-use of the HOV lane is performed only on the highway on the route (step ST106). After that, the route search process is ended.

As previously explained, while because a conventional route search technique gives priority to the use of an HOV lane, there is a case in which a route which urges the user to take a circuitous way is searched for, the navigation device in accordance with Embodiment 9 of the present invention can search for a route which enables the user to use a highway as usual (via the same entrance and the same exit are those proposed by the conventional route search technique), and which can further provide guidance on the use of the HOV lane to the user appropriately.

A combination of two or more of above-mentioned Embodiments 1 to 9 can be implemented.

INDUSTRIAL APPLICABILITY

The present invention can be used for an in-vehicle navigation device which performs a search for a route in an area including HOV lanes.

The invention claimed is:

1. A navigation device comprising:
an input device;
a computer processor; and
a memory on which are stored instructions which, when executed, causes said computer processor to perform a process comprising:
   setting a destination based on input received from the input device,
   detecting a current position of a vehicle based on a received GPS signal,
   acquiring map data including road data in which a High Occupancy Vehicle (HOV) lane and a non-HOV lane are shown by a link, and
   searching for a route leading from said current position to said destination by using said map data, and
   causing data indicating a route that guides said vehicle from said current position to said destination to be outputted to a user, wherein
said route searching is performed by:
   initially searching only for a route leading from said current position to said destination and not using any HOV lane, thereby obtaining an initial route, and, after obtaining said initial route,
   determining whether said initial route includes a highway, and
   only when said initial route is determined to include a highway, conducting a re-search only in the highway on said initial route to obtain a finalized route on a basis of whether an HOV lane on the highway is usable or unusable on the basis of at least one of the following criteria: a distance required to make a lane change into the HOV lane on the highway, a search mode inputted from the input device, and a traffic condition of the highway, and
said finalized route enters and exits said highway at same places, respectively, as said initial route, wherein said initial route or said finalized route is displayed by a display device.

* * * * *